(12) United States Patent
Coleman et al.

(10) Patent No.: US 10,875,194 B1
(45) Date of Patent: Dec. 29, 2020

(54) ADAPTABLE SUCTION CUP ASSEMBLY

(71) Applicant: Amazon Technologies, Inc., Seattle, WA (US)

(72) Inventors: Gregory Coleman, Somerville, MA (US); Timothy Dietz, Reading, MA (US); Beth A. Marcus, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/146,874

(22) Filed: Sep. 28, 2018

(51) Int. Cl.
| | | |
|---|---|---|
| *B25J 15/06* | (2006.01) | |
| *B65G 49/06* | (2006.01) | |
| *F16B 47/00* | (2006.01) | |
| *B25B 11/00* | (2006.01) | |

(52) U.S. Cl.
CPC ......... *B25J 15/0683* (2013.01); *B25J 15/065* (2013.01); *B25B 11/007* (2013.01); *B65G 49/061* (2013.01); *F16B 47/00* (2013.01)

(58) Field of Classification Search
CPC .. B25J 15/0683; B25J 15/065; B25J 15/0675; B25J 15/0691; F16B 47/00; B25B 11/007; B65G 47/917; B66C 1/0268; B66C 1/231
USPC ...................................................... 294/64.2
See application file for complete search history.

(56) References Cited

U.S. PATENT DOCUMENTS

| | | | | |
|---|---|---|---|---|
| 4,389,064 A | * | 6/1983 | Laverriere | B66C 1/025 209/905 |
| 4,657,470 A | * | 4/1987 | Clarke | B25J 9/1015 414/627 |
| 4,703,966 A | * | 11/1987 | Lewecke | B66C 1/0281 294/188 |
| 5,110,239 A | * | 5/1992 | Riley | B25B 11/005 144/144.1 |
| 8,528,955 B2 | * | 9/2013 | Robinson | B25J 11/0045 294/185 |
| 8,714,903 B2 | * | 5/2014 | Feng | B25J 9/0051 414/729 |
| 9,415,520 B2 | * | 8/2016 | Sanders | B25J 15/0616 |

OTHER PUBLICATIONS

"Sunction cups"; https://www.piab.com/en-US/products/suction-cups/; Piab AB; © 2018; accessed Nov. 9, 2018; 3 pages.
"Kenos® Vacuum gripping systems"; https://www.piab.com/en-US/products/kenos-vacuum-gripping-systems/; Pia AB; © 2018; accessed Nov. 9, 2018; 3 pages.

* cited by examiner

*Primary Examiner* — Stephen A Vu
(74) *Attorney, Agent, or Firm* — BakerHostetler

(57) ABSTRACT

A suction-cup end effector conforms to and grasps objects upon application of vacuum force. The suction cup assembly can have isotropic stiffness in a plane defined by a contact surface of the suction cup assembly and thus can conform regardless of the orientation of the suction cup to the object. The suction cup includes a foam suction cup body, a thin structural ring to provide a spring bias toward a rest position, and a sealing membrane within the structural ring to seal the suction cup.

18 Claims, 7 Drawing Sheets

ADAPTABLE SUCTION CUP ASSEMBLY

BACKGROUND

The present disclosure relates to robotics, and more particularly suction-cup type end effectors and related methods.

In general, end effectors used in automated processes are categorized into impactive, which often use jaws or claws that contact and grasp an object; ingressive, which includes pins or the like to penetrate the surface of an object; astrictive, which work by vacuum or magneto-adhesion or the like; and contigutive, which work by an adhesion process, such as gluing or surface tension.

In commercial warehouses, such as fulfillment centers and like facilities, automated processes often employ impactive and astrictive end effectors to handle a vast variation in the shape, size, and mass of objects, as well as to handle randomly oriented objects. For example, conventional end effectors often use a bellows-type or a conical or flared suction cups on an end effector.

DETAILED DESCRIPTION

Figure 1:
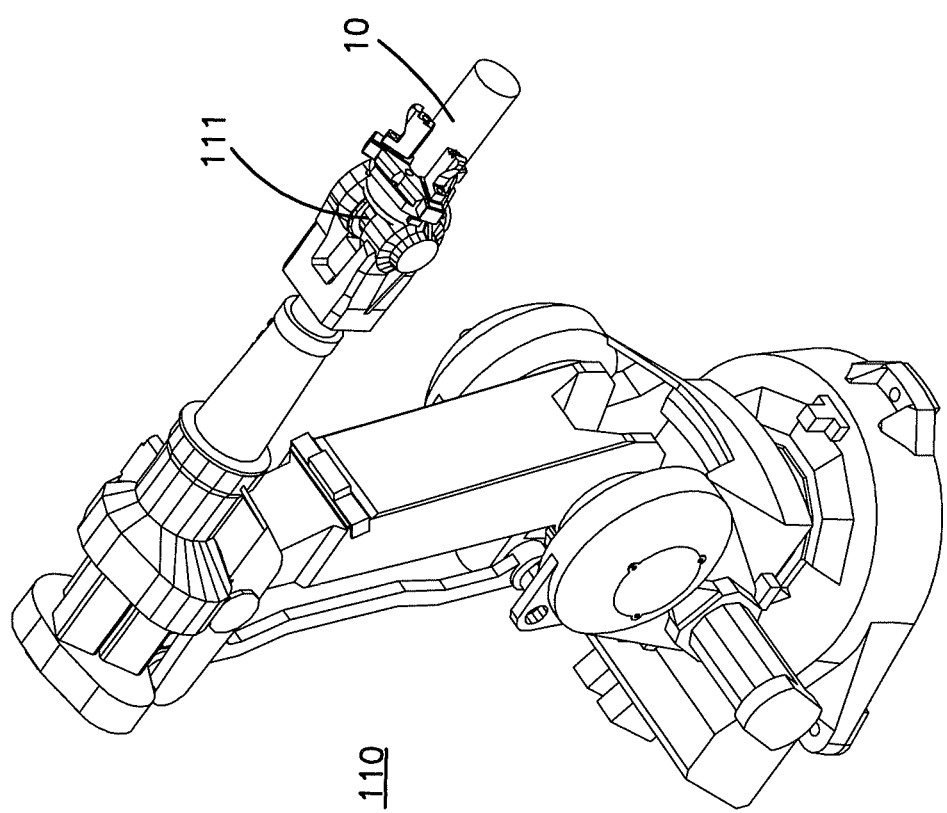
FIG. 1 is a schematic view of a robot employing an end effector disclosed herein.

A robot, such as a gantry or a six axis robot 110 illustrated in FIG. 1, includes an end effector 10, that is capable of grasping an object, and at least in some cases the end effector at least partially adapts or conforms (in shape) to the object to enhance gripping. End effector 10 includes a suction cup assembly that includes a pliable suction cup body having a distal end adapted for contacting the object and a proximal face or end. A flat or planar resilient structural ring is coupled to the proximal side of the suction cup body opposite the contact surface. A pliable sealing bellow or sealing membrane is coupled to the ring and extends radially inwardly from the structural ring. A connector, which preferably is at the center of the suction cup in embodiments in which the suction cup is symmetrical, can be configured to attach to a vacuum port.

The suction cup assembly has a rest or unactuated state or position and an engaged or deformed state or position. In its rest position, the suction cup is in its conventional, flat position in which the contact surface of the suction cup is planar. Perfect flatness is not required for the surface to be planar, as used herein. Upon application of vacuum (preferably), or optionally upon actuation by actuators, such as linear actuators, the suction cup can deform to conform to the shape of an object. In this regard, in some embodiments the only actuation is application of vacuum pressure to the suction cup.

In general, the suction cup assembly is configured to conform to and grasp an object upon application of vacuum and (i) to be compliant such that it is conformable to the object upon application of vacuum, (ii) to lift an object after engagement, and (iii) to resiliently return to its rest state upon disengagement with the object. Thus, the resilient ring (in the embodiment of the figures) has the function of providing a structure that connects between the suction cup ring and the sealing membrane, of being resilient to spring bias the suction cup assembly to its rest position (which can be planar) and also sufficiently deformable to enable the foam to conform itself to the object (which can have a wide variety of shapes and sizes) and be strong enough to transmit the load from the suction cup to the membrane. At least the ring can be capable of bending about an axis. In the embodiments of the figures, the ring can deform about any axis, and can be isotropic in this regard (as defined below).

The suction cup in the embodiments shown in the figures can be any material, and preferably is a resilient foam, and has an aspect ratio, durometer, tensile strength, shear strength, and compression set and density to enable it to readily deform with the structural ring in response to the vacuum applied to its interior when in contact with or near an object, to enable it to conform to the shape of the object, to enable it to grip the object, and to enable it transmit the load from the object to the ring during lifting.

The membrane in the embodiments shown in the figures is flexible, preferably along any axis to enable it to readily deform with the structural ring and to enable it to transmit the load of the object from the ring to a connector that is affixes to an end effector (which phrase encompasses various structures and configurations, including indirect coupling).

Thus, the structural ring can be made of a resilient material to supply a spring force to bias the suction cup assembly to the rest position, such that after release of the item and release of the vacuum pressure, the suction cup assembly returns to its rest position. The term "pliable" as used herein refers the property of being easily elastically deformed. The term "resilient" as used herein refers to the property of being deformable and then, upon release of the deforming force, returning to its undeformed, rest position.

The sealing bellows or membrane may be formed of a pliable material that provides an air seal (which term "seal" encompasses an imperfect sealing material or sealing configuration that merely inhibits air leakage). The connector may be of any type, such as an elastomer or other flexible or inflexible grommet or nipple of any configuration. The suction cup assembly may have isotropic stiffness in the plane defined by the structural ring while the suction cup assembly is in the rest position. In this regard, the stiffness of the suction cup assembly is the same regardless of the axis of bending (in the plane of the suction cup). Preferably, the sealing bellows or sealing membrane is planar.

In embodiments having isotropic stiffness, the suction cup assembly may be easily and quickly installed on an end effector body or vacuum system fitting or tube via a quick-change grommet. The quick-change grommet can include a rim of pliable material, a nipple, a barbed connection, or the like.

The isotropic stiffness enables the suction cup assembly to have the same deformation in response to forces applied to the suction cup (such as suction pressure that induces movement of the suction cup) regardless of the angular position at which it is installed on the vacuum port, as the bending properties are the same about the suction cup. Other suction cups having a fixed, structural hinge require angular alignment with the end effector structure to enable the end effector to actuate the suction cap, and the end effector must then place the hinge axis in the desired orientation relative to the object.

In the embodiments disclosed herein having isotropic stiffness, the alignment required by a fixed, structural hinge is unnecessary because the suction cup disclosed herein can bend or conform regardless of its axial position on the end effector and regardless of its orientation relative to the object. Further, the suction cup structure disclosed herein is lightweight and, when formed of inexpensive materials, can be disposable and/or changed for different sizes or shapes of suction cup assemblies are desired.

The structural ring can be formed of a spring steel or a flexible polymer, such as a urethane, an ethyl vinyl acetate (EVA), a polyurethane, a thermoplastic urethane (TPU), moldable or extrudable polymers such as thermoplastic elastomers (TPEs), thermosets such as liquid-injection-molded (LIM) or compression molded silicone or other material, depending on the desired functional aspects of the suction cup, and other parameters, such as diameter, magnitude of vacuum pressure, whether biasing springs are employed, and like parameters, as will be understood by persons familiar with suction cup technology in view of the present disclosure.

The suction cup body can be formed of a pliable material, such as a material comprising an open cell rubber sponge. For example, the suction cup body may include moldable and/or extrudable polymers. The structural ring will typically be stiffer, and in some embodiments have at least twice the stiffness, of the soft, deformable foam.

In embodiments having actuators, the suction cup assembly can have ears, recesses, or like structure for coupling to the actuators and/or receiving linear force for actuation between the rest position and engaged position. For embodiments omitting actuators, the suction cup assembly can have ears (that is, any protrusion or recess) for receiving springs for biasing the suction cup assembly (not shown in the figures).

A method of grasping an item using an end effector includes: positioning the end effector relative to the object; applying vacuum pressure to an interior chamber of a suction cup assembly of the end effector such that the suction cup conforms to a shape of the object and such that a structural ring of the suction cup assembly flexes about the object in response to the applying vacuum pressure step, whereby the suction cup grasps the object; moving the end effector to transport the object after the applying and grasping steps; and releasing the object after the moving step to release the object from the suction cup assembly. The step of position the end effector can be performed by any method, and may be conventional.

The step of applying vacuum pressure step can include applying vacuum pressure such that a suction cup body, the structural ring, and a sealing membrane that extends inwardly from the structural ring conform to the shape of the object upon the applying vacuum pressure step. The suction cup assembly can have isotropic stiffness in a plane defined by the structural ring while the suction cup assembly is in the rest position, and the suction cup assembly can conform to the shape of the object regardless of the orientation of the suction cup body relative to the object. These steps can be performed only by the application of vacuum pressure, without external actuators (other than the end effector positioning the suction cup).

The suction cup assembly can be connected to a vacuum port by pushing a connector of the suction cup assembly onto or into the vacuum port while the sealing membrane of the suction cup assembly is planar, which step can be performed quickly and easily without tools.

Figure 2:
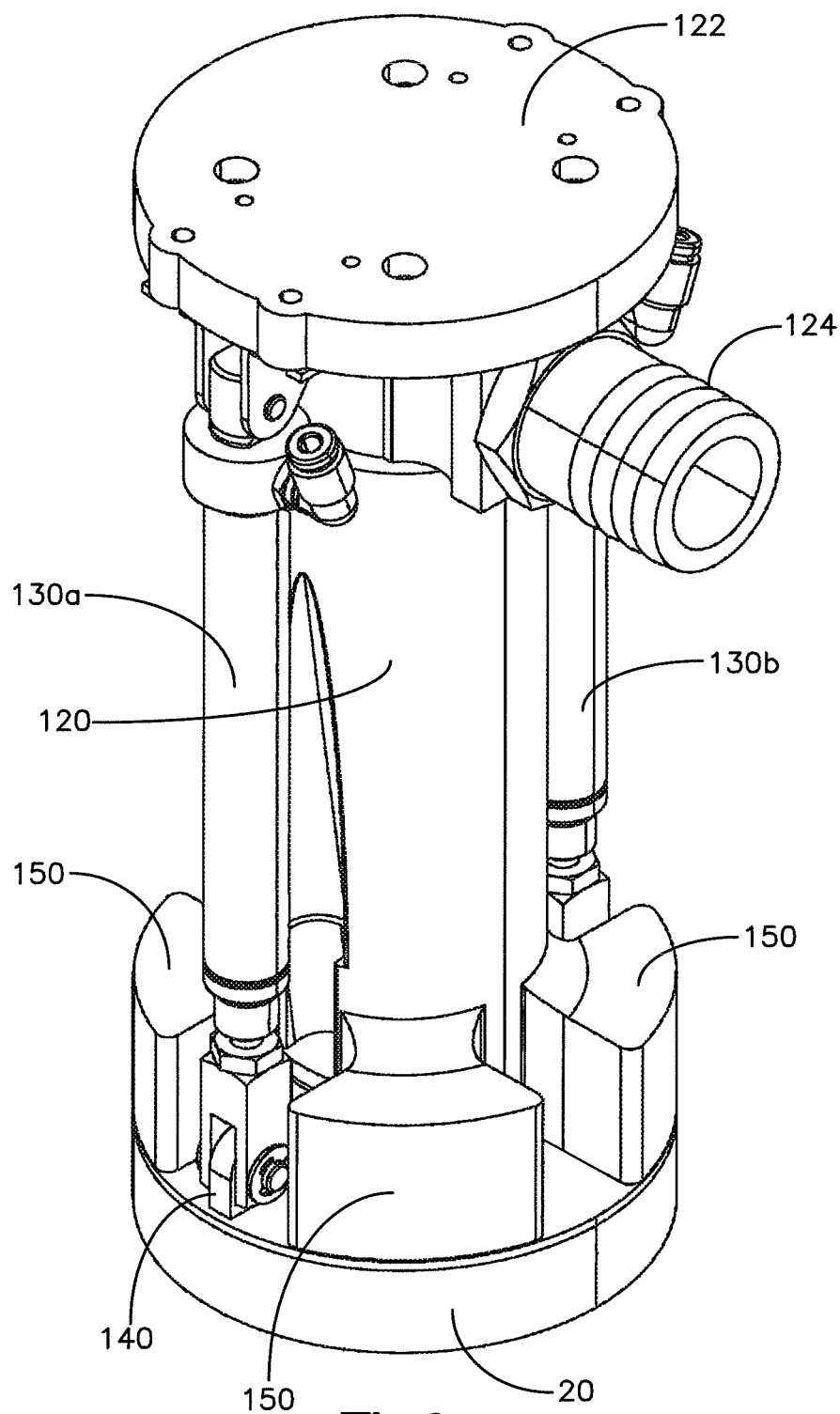
FIG. 2 is view of a perspective view of an end effector disclosed herein.
Figure 3:
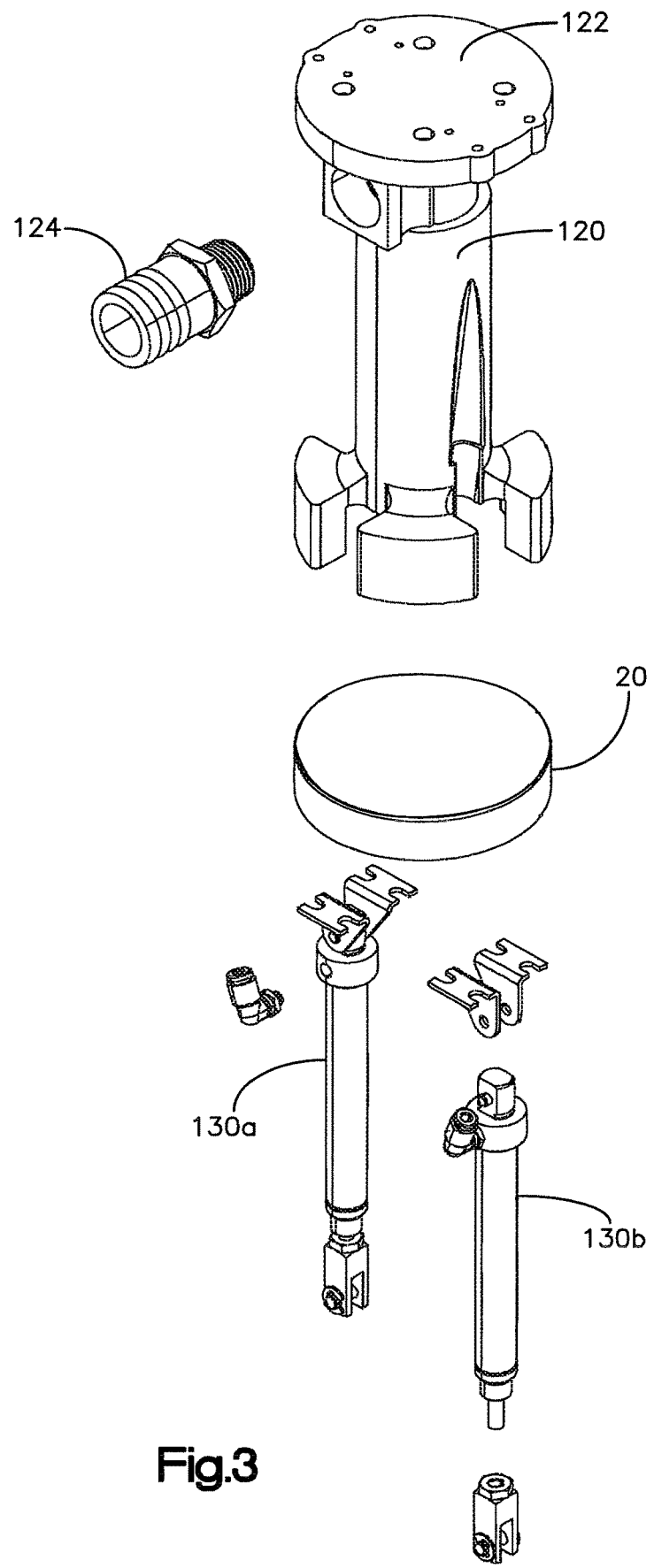
FIG. 3 is an exploded view of the end effector of FIG. 2.

Referring to FIGS. 1 through 3, an end effector 10 includes a structural body 120 having a mounting plate 122 for mounting to the arm 111 of robot 110, and a vacuum suction port 124 that transmits vacuum from a vacuum source (not shown in the figures) through body 120 and to a suction cup assembly 20. The inboard surface of suction cup assembly forms chamber, as described more fully below. A pair of linear actuators, such as pneumatic actuators 130a and 130b extend from a proximal portion (that is, the portion nearest the robot) of body 120 to an ear 140 attached to suction cup assembly 20.

In operation, actuators 130a and 130b extend to bend suction cup 20 from the rest position shown in FIG. 2 to an engaged position about an axis defined by the function of the actuators. Stops 150 are formed on a distal end of body 120 to register suction cup 120 into its rest position. Suction cup 20 can have the structure and function (such as conforming capabilities) of the suction cup assemblies described herein.

As partly schematically illustrated in FIG. 3, a first embodiment suction cup assembly 20 includes a suction cup body 30, a structural ring 50, a bellows or sealing membrane 60, and a connector 70. Suction cup body 30 forms a chamber 36 within the suction cup, and preferably is an open celled rubber sponge having a density of 0.25. An example of the density the foam that can be used is 300 kg/m^3. The body 30 may also be a hybrid material such as natural latex enhanced urethane foam or block copolymers. The durometer of the foam can range from Shore 25A to 65A. Preferably, the compression set at warehouse temperature, 10 C to 35 C, should be less than 20%, such as less than 5%.

The material of suction cup body 30, in many circumstances, may be chosen for its ability to easily conform to an object during the grasping phase and to elastically regain its un-deformed shape after actuation. Thus, many other materials may be used, such as (for non-limiting examples) polymeric foams such as nitrile rubber foam, polyurethane foam, silicone foam, polychloroprene foam (neoprene), and the like. Preferably, the material of suction cup body 30 is easily compressible.

Preferably, suction cup 20 is a circular ring, although other shapes, such as oval, irregularly shaped, rectangular, etc. may be employed according to the desired characteristics of the application. Thus, the present invention is not limited to any particular configuration or material for forming the suction cup.

Structural ring 50 may be formed of a thin 316 stainless spring steel. In some examples, the ring 50 may be an annealed 303 SS, and in other examples a urethane having a shore 90 (A) durometer. Ring 50 is attached to a proximal surface 24 of suction cup body 30, such as by an adhesive. Any attachment means may be employed to couple ring 50 and suction cup body 30 together. The term "couple" is used broadly herein to refer to structures being relatively held together, either in direct contact with one other or indirectly by having other components or materials between the structures.

Sealing membrane 60 preferably is a planar disk formed of an impermeable sheet, film, or fabric that is coupled to and sealed to ring 50 by a ring 62 of pliable, soft transition material. The material of ring 62 may include a wide variety of materials chosen for its function of adhering and sealing membrane 60 and ring 50 together without unduly increasing bending stiffness. For example, an ethyl vinyl acetate (EVA), a polyurethane, and the like may be used. Other non-limiting examples of pliable materials include elastomeric materials such as latex, rubber, and silicone. Any other means for attaching or adhering membrane 60 to ring 50, such as adhesives, mechanical fasteners (including screws, locking rings, clamps, and the like), sewing, melting or welding, and the like, may be employed.

Axes A1 and A2 in the plane of ring 50 are drawn arbitrarily to illustrate the isotropic stiffness of suction cup 20. In this regard, suction cup 20 will have a stiffness that is the same about all axes A1, A2, and others in the plane of ring 50 and/or in the plane of contact surface 32. Thus, the bending response or like deflection in response to a given force is the same about any axis A1, A2, etc.

Figure 4:
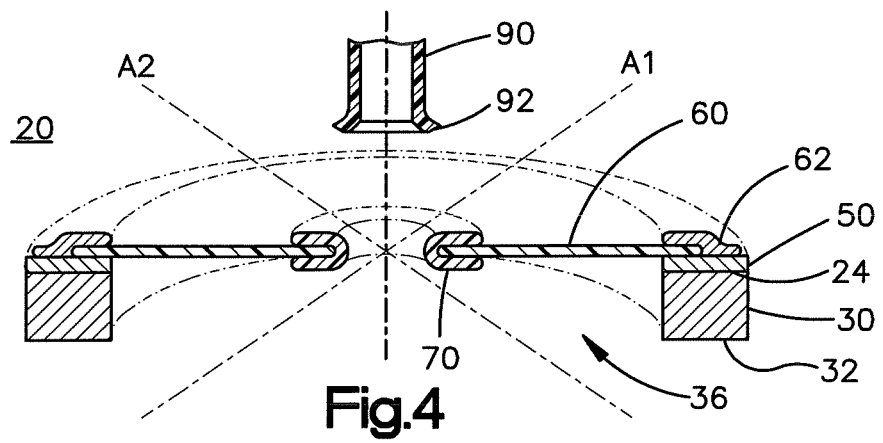
FIG. 4 is a perspective view of a first suction cup assembly embodiment.

Connector 70 in the embodiment of FIG. 4 is a ring of pliable, soft material, and may be the same or like material as that used for ring 62, or any other conventional elastomer or conventional sealing material. Connector 70 is connected to an aperture or through-hole in sealing membrane 60, and wraps around the aperture to form a C-shape in cross section. A vacuum port 90, shown schematically in FIG. 4, can be a rigid tube or housing, a flexible hose that is supported by other structure, or any other structure that can deliver vacuum pressure to suction cup assembly 20 and provide a structure with which connector 70 can interface in order to mechanically retain suction cup 20. As an example, port 90 includes a barb 92 protruding from the outboard surface at or near its lower lip or rim. Preferably, barb 92 is circular and continuous for ease of application to suction cup 20; other configurations are contemplated.

Figure 5:
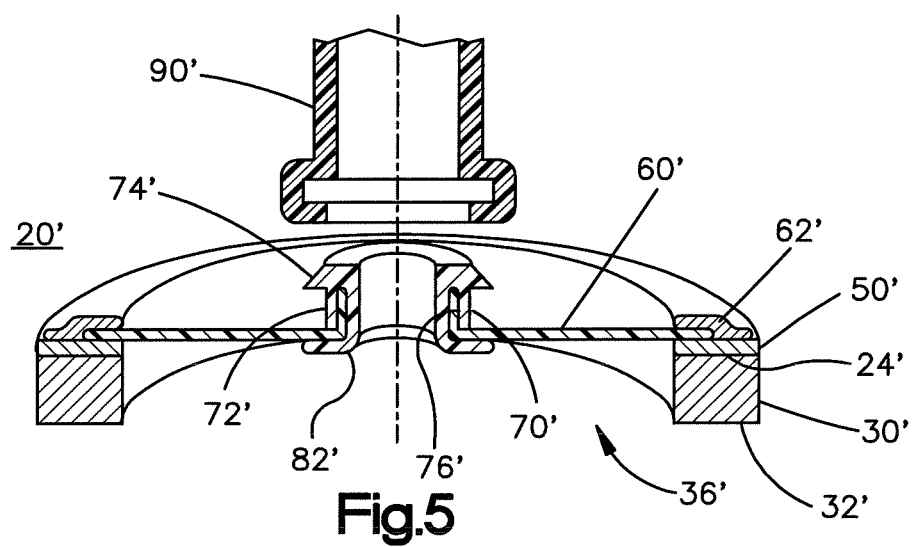
FIG. 5 is a view of a second suction cup assembly embodiment.
Figure 6:
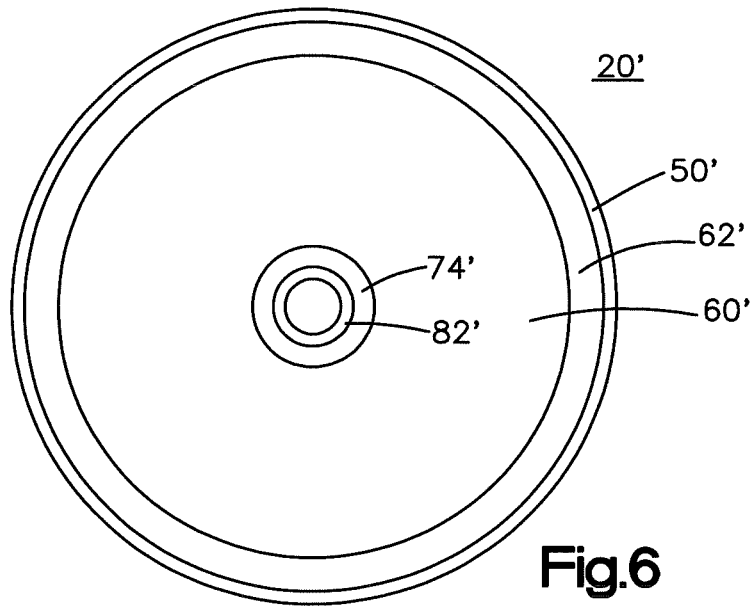
FIG. 6 is a top view of the suction cup assembly of FIG. 5.

FIG. 5 illustrates a second embodiment of a suction cup 20' that includes a suction cup body 30', a structural ring 50', a bellows or sealing membrane 60', and a connector fitting 70'. Body 30' and ring 50' may be as described for first embodiment body 30 and ring 50. Sealing membrane 60' can be attached to ring 50' as described above for first embodiment sealing membrane 60.

Connector fitting 70', as illustrated in FIG. 5, is a nipple or upstanding ring 72' having a circular, peripheral barb 74' protruding from the outboard side on or near its upper lip. The innermost lip or portion 64' of sealing membrane 60' wraps under and extends into the inboard surface 76' of fitting 70'. A pliable material 82' may be located over the interface between sealing membrane innermost lip 64' and the inboard surface of fitting 70'. Material 82' may be the same material as described above for material 62. Any other means for attaching or adhering sealing membrane 60' to fitting 70', such as adhesives, mechanical fasteners (including screws, locking rings, clamps, and the like), sewing, melting or welding, and the like, may be employed.

To install or apply suction cup 20 or 20' to connector 70 or 70', the suction cup may be merely applied by hand onto the connector, using force as needed to enable the barb 92 or 74' to snap or deflect into place. Other means for connecting the suction cup to the vacuum port, such as threaded connections, spring ball-type or other detents, locking pins with J-shaped channels, mechanical fasteners, temporary or releasable adhesives, magnets, and others may be employed.

Figure 7:
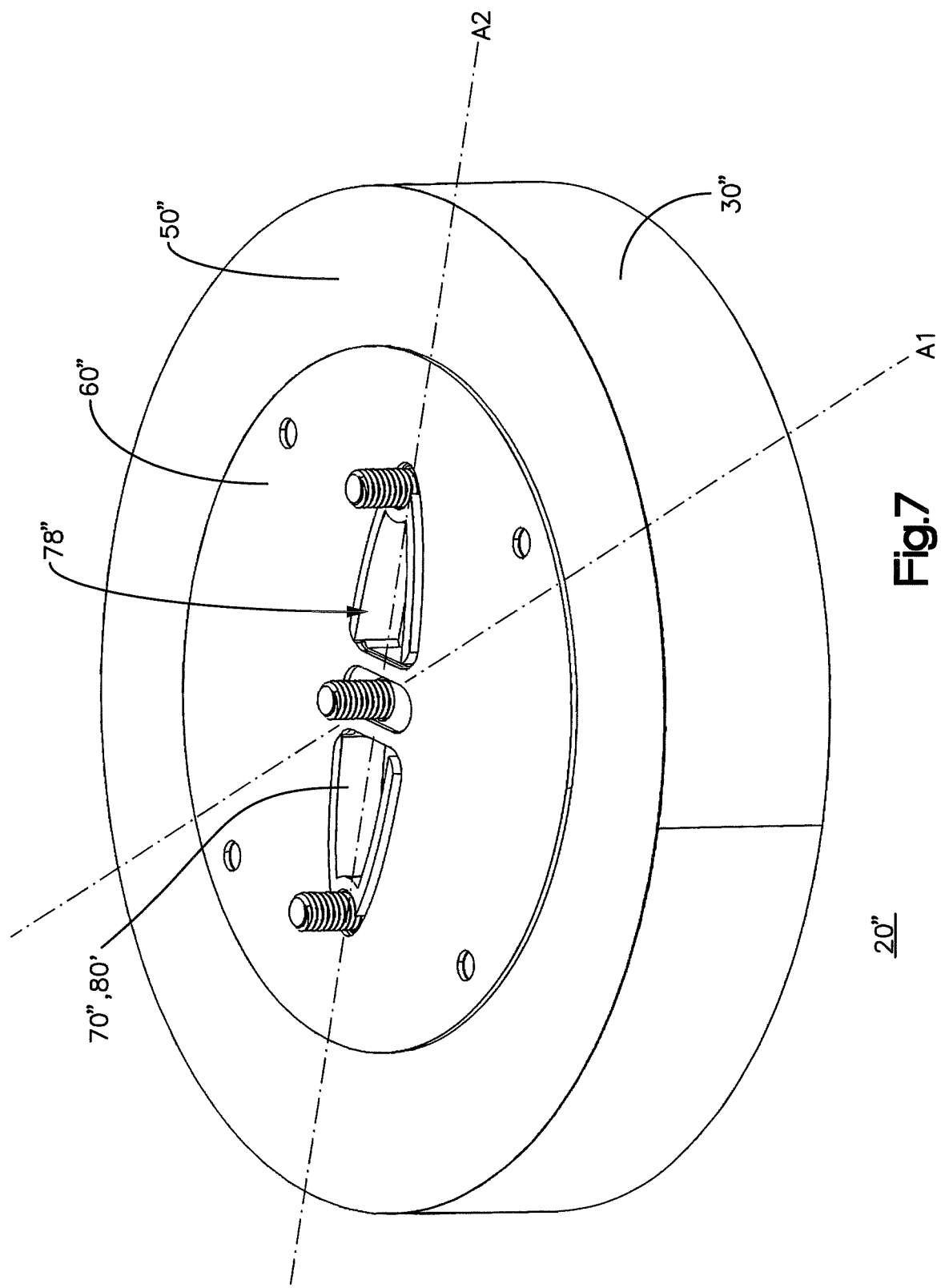
FIG. 7 is a perspective view of a third embodiment suction cup assembly.
Figure 8:
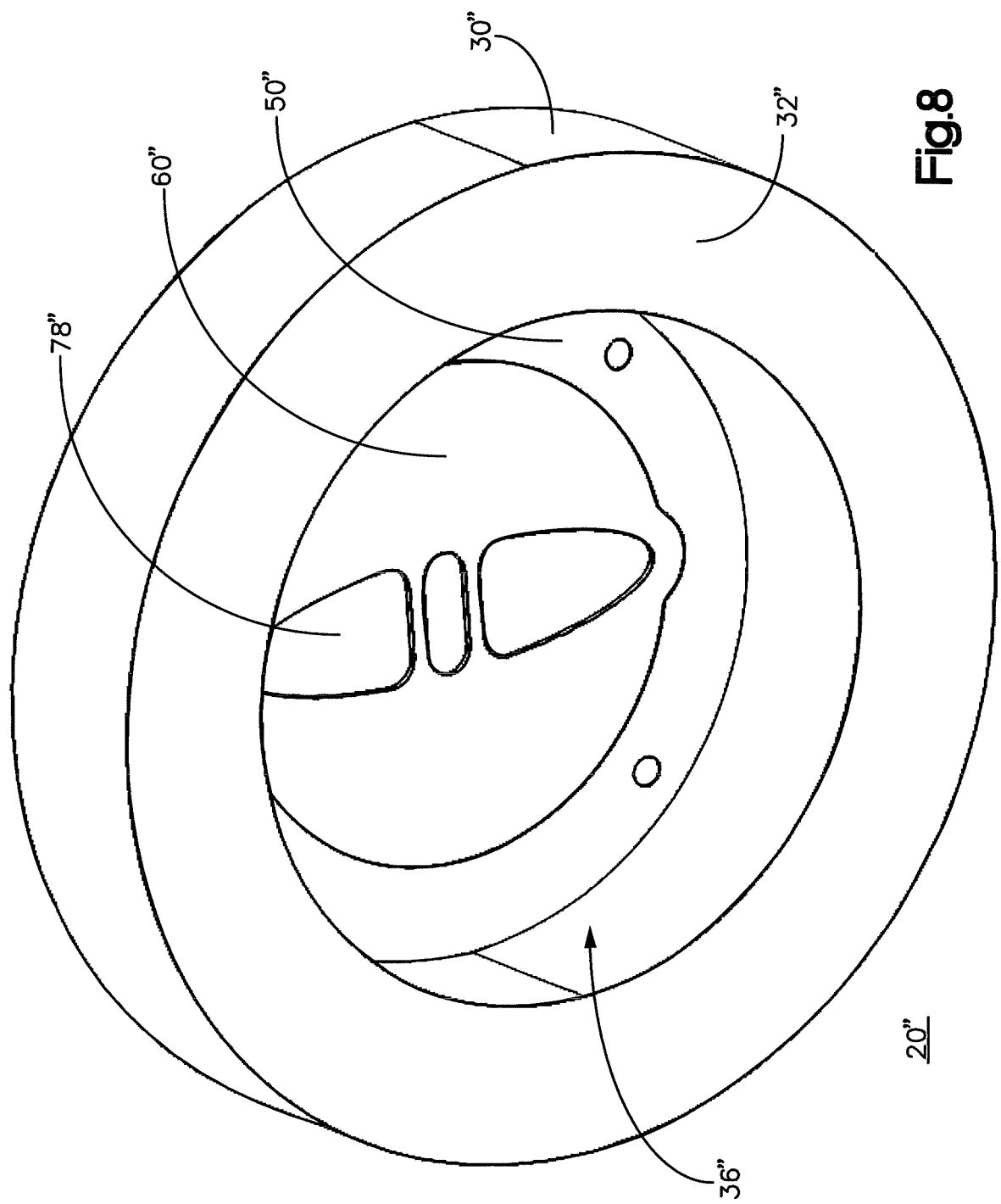
FIG. 8 is perspective, cross sectional view of an underside of the embodiment of FIG. 7.

FIGS. 7 and 8 are views of another embodiment suction assembly 20" that includes that includes a suction cup body 30", a structural ring 50", a bellows or sealing membrane 60", and a connector fitting 70". Body 30" may be as described as (that is, have the same structure and function) first embodiment body 30, described above. Ring 50", as illustrated in the figures, is a disk that extends radially inwardly from an inboard surface of suction cup body 30" (as best illustrated in FIG. 8), and thus covers or extends over a portion of the interior chamber 36" formed by suction cup body 30". Sealing membrane 60", which can be attached to ring 50" as described above for first embodiment sealing membrane 60, extends from an inboard rim of ring 50" and includes openings 78" through which vacuum pressure is transmitted. A connector 70" includes an elongate metal fitting 80" that is attached to sealing membrane 60" by screws. Fitting 80" can attach to any corresponding structure of the end effector.

Openings 78" as illustrated in the figures are not radially symmetrical. Sheet 60" is formed of a pliable material, such as a fabric, and thus the asymmetrical openings do not materially affect the isotropic stiffness of suction cup assembly 20", apart from the metal connector 70". A Cordura™ nylon of 600 to 1,000 is an example of a product that may be employed to form the sheet of material. Alternatively or in combination, a synthetic leather materials such suede which may have similar properties in all directions may be used. Additionally, materials that have different properties in certain directions, such as elongation, may be used. An example would be 2× greater elongation in the x-axis vs the y-axis.

As illustrated in the drawing of suction cup 20", ring 50" is thin to promote ease of deformation and conformance. The thickness of ring 50, 50', and 50" can be chosen according to the particular parameters of the application, such as the magnitude of the vacuum pressure, diameter of the suction cup body, desired stiffness, and the like. A range of 0.0005 inches to 0.002 inches (one half to two thousandths) are examples of a steel ring thickness for a suction cup of two to five inches in diameter. For a polymer ring such as urethane, the range may be 0.010 to 0.150 depending on the mass of the object being captured and manipulated, and other parameters of the particular application.

Figure 9:
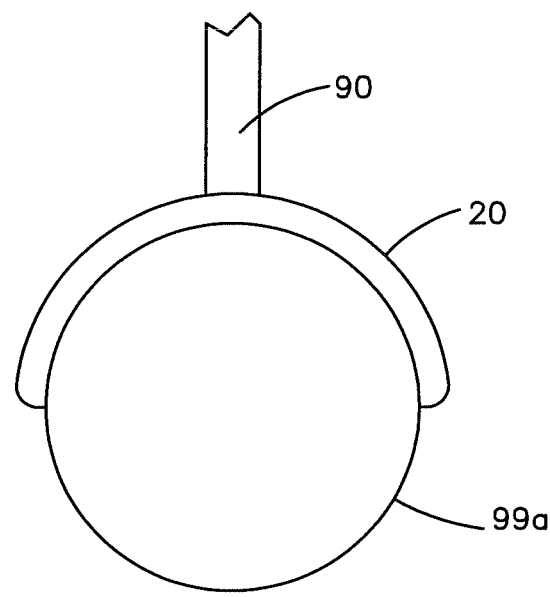
FIG. 9 is a schematic, end view illustration of a suction cup assembly engaging a cylindrical object.
Figure 10:
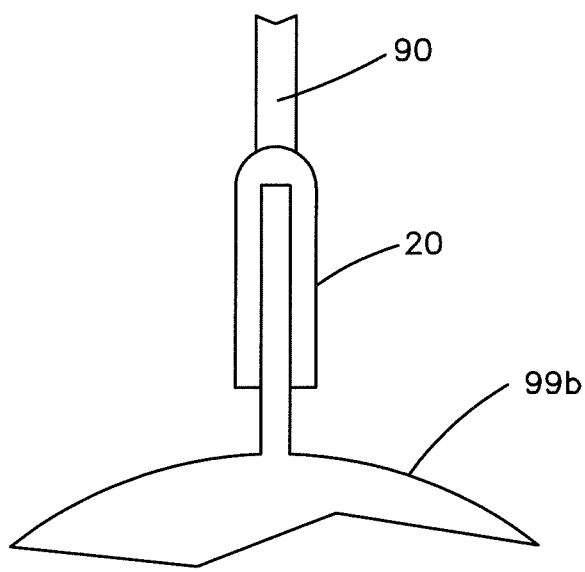
FIG. 10 is a schematic end view illustration of a suction cup assembly engaging a thin object.

FIGS. 9 and 10 schematically illustrate an engaged position of a suction cup 20. To illustrate grasping of a cylindrical object 99a, which is shown in end view in FIG. 8, for the suction cup (which is referred to by reference number 20 to refer to generally to any suction cup disclosed herein) when located near or in contact with object 99a, the magnitude of vacuum pressure in chamber 36 and the low stiffness of the suction cup assembly (about any axis A1, A2, etc., as illustrated in FIG. 7) induces suction cup assembly 20 to wrap around and conform (by taking or approximately taking the shape) to the cylindrical surface of object 99a. In this regard, the flexibility of suction cup 20 enables the profile of suction cup 20 to form a saddle shape, which in the end view of FIG. 9 is illustrated as a segment of a circular shape. Suction cup body 30 compresses and ring 50 deflects in a continuously varying profile to accommodate the curved cylinder during the engagement process.

FIG. 10 illustrates suction cup 20 applied to a flat portion of a blister pack 99b that has a flat, planar surface that extends above a plastic compartment, such as a package popular for retailing batteries and other small items. As suction cup 20 is near or engaged with a top rim or lip of package 99b, suction cup 20 is drawn down over the flat portion of package 99b until all portion of suction cup 20 engages the flat portion of package 99b. Thus, suction cup 20 deforms by folding as if by forming a hinge. Suction cup body 50 compresses and hinge 50 is planar or nearly planar to match the planar shape of the flat portion of package 99b.

The position and orientation of the end effector may be controlled through instructions from the control system. Specifically, the control system may receive input from a human operator and/or a grasp planning program so as to employ custom grasping strategies for various shapes of items. For example, in relation to suction-type end effectors, six-sided boxes with planar surfaces may require only simple grasping strategies regardless of size and orientation. But items with more complex surfaces may be difficult to grasp, especially if these items are disposed in close proximity to other items and objects, such as when multiple items are disposed in a storage container such as a gaylord. Any number and types of sensors may be employed and affixed to the end effector, as needed and will be understood by persons familiar with suction cup end effectors in view of the present invention.

In some embodiments, the control system may receive data from one or more sensors (for example, optical, contact, proximity, etc.) disposed on and/or around the end effector. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two dimensional image of the item showing a feature may allow an identification of a respective surface. If the two dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.).

Control may also be via mechanical analog control where when vacuum is achieved. For example, when the cup captures the target object, the vacuum pressure at the end of arm tool increases rapidly. An analog mechanical vacuum valve may be employed to respond to the change in vacuum and freeze the shape of the suction cup once capture is achieved. Alternately the change in pressure at capture can be used to freeze motor motion once capture is achieved.

Alternately, if electric motors are used, the current into the motor will also indicate when capture is achieved. As the cup wraps around the captured object, further deformation of the cup is only possible by rapidly increasing the force applied by the motors. More force will not increase the capture, but may damage the cup and the captured article to be manipulated. When both vacuum is achieved and the force (current into the motors) begins to increase, the motors can be configured freeze to prevent damage to the captured target article.

The control system may receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The end effector structure and function are described herein by referring to advantages and specific examples or embodiments. The present invention is not limited to the advantages explained herein, nor to the structure or function of the examples or embodiments. Moreover, the text is intended to describe the specific embodiments shown in the figures. The structure and function shown and described is intended only for example. For non-limiting examples, the location and types of seals, the location of corresponding parts and their movements, and the function descriptions are not intended to limit the scope of the invention. Rather, it is intended that the invention be given the full scope of the plain meaning of the claims.

What is claimed is:

1. A suction cup assembly configured to conform to and grasp an object upon application of vacuum, the suction cup assembly comprising:
   a flat, resilient ring;
   a foam cup attached to the ring;
   a planar, flexible membrane attached to the ring and extending radially inwardly from the ring; and
   a quick-connect coupling that is coupled to the membrane and that is adapted for coupling the suction cup assembly to a vacuum port of a vacuum source;

wherein the suction cup assembly is configured (i) to be compliant such that it is conformable to the object upon application of vacuum, (ii) to lift an object after engagement, and (iii) to resiliently return to its rest state upon disengagement with the object.

2. The suction cup assembly of claim 1 wherein the suction cup assembly is biased by the ring toward a rest position such that the suction cup assembly is adapted to return to the rest position upon release of the vacuum.

3. A suction cup assembly configured to grasp objects, the suction cup assembly comprising:
    a pliable suction cup body including a distal, contact surface adapted for contacting an object;
    a resilient structural ring coupled to a proximal side of the suction cup body, the structural ring being approximately planar while the suction cup is in the rest position;
    a pliable sealing membrane coupled to and extending radially inwardly from the structural ring; and
    a connector formed in the sealing membrane and adapted for connecting the suction cup assembly to a structure of an end effector;
    whereby the suction cup assembly is configured to deform to the shape of an object by the structural ring deforming about an axis in response to vacuum pressure through the connector to lift the object.

4. The suction cup assembly of claim 3 wherein the suction cup assembly is configured (i) to be compliant such that it is conformable to the object in response to vacuum, (ii) to lift an object after engagement, and (iii) to resiliently return to its rest state upon disengagement with the object.

5. The suction cup assembly of claim 4 wherein the structural ring is planar, formed of one of a spring steel and a urethane, configured to bias the suction cup assembly toward its rest position.

6. The suction cup assembly of claim 5 wherein the sealing membrane is a planar sheet while the suction cup assembly is in the rest position and wherein the sealing membrane is configured to transmit load from the structural ring to the connector while lifting the object.

7. The suction cup assembly of claim 4 wherein the suction cup assembly has isotropic stiffness in a plane defined by a contact surface of the suction cup assembly.

8. The suction cup assembly of claim 4 wherein the axis about which the structural ring deforms depends on the orientations of the object and is independent of the orientation of the end effector carrying the suction cup assembly.

9. The end effector of claim 3 wherein further comprising a sealing material over an outer portion of the sealing membrane.

10. The suction cup assembly of claim 3 wherein the connector is a quick-change grommet.

11. The suction cup assembly of claim 3 wherein the suction cup body is formed of a material comprising an open cell rubber sponge.

12. The suction cup assembly of claim 3 wherein the suction cup is configured to be deformed by at least two linear actuators.

13. A method of grasping an object using an end effector, comprising the steps of:
    positioning the end effector relative to the object;
    applying vacuum pressure to an interior chamber of a suction cup assembly of the end effector such that the suction cup body, a structural ring, and a sealing membrane that extends inwardly from the structural ring conform to a shape of the object in response to the applying vacuum pressure step, whereby the suction cup grasps the object;
    moving the end effector to transport the object after the applying and grasping steps; and
    releasing the object after the moving step to release the object from the suction cup assembly.

14. The method of claim 13 wherein the suction cup assembly has isotropic stiffness in a plane defined by the structural ring while the suction cup assembly is in the rest position.

15. The method of claim 14 wherein the suction cup assembly conforms to the shape of the object regardless of orientation of the suction cup body relative to the object.

16. The method of claim 13 further comprising the step of applying the suction cup assembly to a vacuum port by pushing a connector of the suction cup assembly onto or into the vacuum port while the sealing membrane of the suction cup assembly is planar.

17. The method of claim 16 wherein suction cup assembly is disposable.

18. The method of claim 16 wherein the applying step is performed without tools.

* * * * *